United States Patent
Sato (10) Patent No.: US 10,879,516 B2
(45) Date of Patent: Dec. 29, 2020

(54) BUSBAR, BUSBAR MODULE, AND BATTERY PACK

(71) Applicant: YAZAKI CORPORATION, Tokyo (JP)

(72) Inventor: Katsunori Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 139 days.

(21) Appl. No.: 16/058,697

(22) Filed: Aug. 8, 2018

(65) Prior Publication Data

US 2019/0067662 A1 Feb. 28, 2019

(30) Foreign Application Priority Data

Aug. 30, 2017 (JP) .................. 2017-165714

(51) Int. Cl.
*H01M 2/20* (2006.01)
*H01M 2/10* (2006.01)

(52) U.S. Cl.
CPC ......... *H01M 2/206* (2013.01); *H01M 2/1077* (2013.01)

(58) Field of Classification Search
None
See application file for complete search history.

(56) References Cited

U.S. PATENT DOCUMENTS

2017/0179458 A1* 6/2017 Sato .................... H01M 2/1077

FOREIGN PATENT DOCUMENTS

| JP | 2000-106170 A | | 4/2000 |
|---|---|---|---|
| JP | 2015-95402 A | | 5/2015 |
| JP | 2015095402 A | * | 5/2015 |
| JP | 2017-112066 A | | 6/2017 |
| JP | 2017-130287 A | | 7/2017 |
| JP | 2017130287 A | * | 7/2017 |

* cited by examiner

*Primary Examiner* — Daniel S Gatewood
(74) *Attorney, Agent, or Firm* — Kenealy Vaidya LLP (57) ABSTRACT

A busbar includes a coupling plate portion provided between two cell electrodes respectively provided on adjoining two battery cells, and a total of not more than three protrusions protruded on a facing surface of the coupling plate portion so that at least one of the protrusions is in contact with each of the two cell electrodes, the facing surface of the coupling plate portion facing the cell electrodes.

6 Claims, 8 Drawing Sheets

BUSBAR, BUSBAR MODULE, AND BATTERY PACK

CROSS REFERENCE TO RELATED APPLICATIONS

This application is based on Japanese Patent Application (No. 2017-165714) filed on Aug. 30, 2017, the contents of which are incorporated herein by reference.

BACKGROUND OF THE INVENTION

1. Field of the Invention

The present invention relates to a busbar, a busbar module and a battery module.

2. Description of the Related Art

In a battery back mounted on a vehicle such as an electric car or a hybrid car, the cell electrodes of a multiplicity of battery cells are arranged side by side while being placed one on another so as to adjoin each other, and are electrically connected in series or in parallel, whereby an assembled battery is structured. To this assembled battery, a busbar module is attached. In the busbar module, busbars electrically connecting between the cell electrodes are accommodated in a plurality of busbar accommodating chambers defined in a case made of an insulating resin. For example, there is JP-A-2000-106170 as a prior art.

When the busbars and the cell electrodes are weld-connected in the battery pack, it is necessary to set the busbars and the cell electrodes so that they are in intimate contact (surface contact) with each other. On the other hand, the cell electrodes of the battery cells vary in height tolerance and flatness. For this reason, to bring the busbars and the cell electrodes into intimate contact, it is necessary to deform the busbars by pressing the busbars against the cell electrodes with an extremely strong force.

However, if the board thickness of the busbars is increased in order to pass a large current, a stronger force is required to deform the busbars by pressing them against the cell electrodes. Since a large load is applied to the cell electrodes as a consequence, it is necessary to improve the strength of the cell electrodes, so that the member cost of the battery cells is increased. Moreover, since a welding machine provided with a welding electrode capable of pressing strongly is required, the manufacturing cost of the battery pack is also increased thereby.

SUMMARY OF THE INVENTION

The present invention is made in view of the above circumstances, and an object thereof is to provide a busbar, a busbar module and a battery pack where weld connection can be inexpensively made by making it unnecessary to deform the busbars with a strong force when the busbars are weld-connected between the cell electrodes of the battery cells that vary in height tolerance and flatness.

The above-mentioned object of the present invention is attained by the following structures:

(1) A busbar provided with: a coupling plate portion provided between two cell electrodes respectively provided on adjoining two battery cells; and a total of not more than three protrusions protruded on a facing surface of the coupling plate portion so that at least one of the protrusions is in contact with each of the two cell electrodes, the facing surface of the coupling plate portion facing the cell electrodes.

According to the busbar of the structure of the above (1), on the facing surface of the coupling plate portion provided between the cell electrodes of the adjoining battery cells, a total of not more than three protrusions are formed so that at least one is in contact with each of the two cell electrodes. The above-described busbar is capable of absorbing variations in the height tolerance and flatness of the cell electrodes by these protrusions protruding from the facing surface of the coupling plate portion facing the cell electrodes. Therefore, with the above-described busbar weld-connected between the cell electrodes of the battery cells, pressing with a heavy load that deforms the coupling plate portion is unnecessary in order to bring them into intimate contact with the cell electrodes.

Moreover, with the above-described busbar, a conventional step bending structure or the like for making the coupling plate portion easy-to-deform is unnecessary. Since the step bending structure or the like of the coupling plate portion is unnecessary for the busbar, reduction in the height of the busbar and reduction in manufacturing cost can be achieved.

Moreover, with the above-described busbar, since pressing with a heavy load that deforms the coupling plate portion is unnecessary, a load for the coupling plate portion to return to the original shape (spring-back load) does not remain. With the busbar where no springback occurs on the coupling plate portion, vibration resistance of the points of contact with the cell electrodes can be improved and the strength design of the cell electrodes is easy.

Moreover, the number of protrusions of the busbar may be a total of three. That is, the coupling plate portion provided between the cell electrodes are in contact with either one of the cell electrodes at two protrusions. Increasing the number of protrusions protruded on the facing surface of the coupling plate portion to increase the area of intimate contact with the cell electrodes is advantageous particularly when high current is passed. However, the busbar is such that all the contact points can be stably in contact by the three protrusions being in contact with the contacted surfaces of the cell electrodes. With the busbar where three protrusions are protruded on the coupling plate portion, since the posture is stable when it is placed on the cell electrodes, weld connection is facilitated. When a fourth protrusion is provided, contact failure is apt to occur at any one of the contact points, which can cause heat generation at the contact point of the protrusion where contact failure occurs.

With the busbar, by setting the number of protrusions that are in contact with the cell electrodes to a total of not more than three (that is, two or three) such that at least one is in contact on the facing surface facing the cell electrodes, the protrusion where contact failure is apt to occur can be excluded while intimate contact with the cell electrode is made. As described above, with the busbar, by setting the number of protrusions that are in contact with the cell electrodes to two or three, the intimate contact of all the contact portions can be ensured without the need to deform the coupling plate portion welded to the cell electrodes by pressing it against the cell electrodes. As a consequence, management points for welding are limited and this facilitates management, so that the welding cost of the busbar can be reduced.

(2) The busbar according to the above (1), wherein a protrusion height of the protrusions from the facing surface is set to a dimension such that the coupling plate portion inclined because of a displacement caused by a dimensional tolerance between the two battery cells is in contact with no other members.

According to the busbar of the structure of the above (2), the protrusions are formed with a protrusion height where the facing surface of the coupling plate portion is in contact with no other members also by the inclination of the busbar caused by the dimensional tolerance between the battery cells. The other members are members other than the busbar. Therefore, the facing surface of the coupling plate portion of the busbar are set so as not to be in contact with the cell electrodes, either. That is, the coupling plate portion of the busbar is in contact with the cell electrodes only at the protrusions. This is in order to avoid a situation in which the facing surface of the coupling plate portion abuts on electrode angular portions of the cell electrodes first and the protrusions become separated from the cell electrodes. When the cell electrodes are disposed so as to be substantially flush with the body surfaces of the battery cells, the protrusion height of the protrusions is set to a dimension such that the facing surface of the busbar does not interfere with body angular portions. By the protrusions being set with such a protrusion height, even if the adjoining battery cells are displaced within a range of the dimensional tolerance, with the busbar, a total of not more than three protrusions such that at least one is in contact with each of the adjoining cell electrodes can be surely brought into contact.

(3) The busbar according to the above (1) or (2), further includes another coupling plate portion provided between the two cell electrodes, wherein the coupling plate portion and the another coupling plate portion are arranged in parallel between the two cell electrodes to electrically connect between the two cell electrodes in parallel.

According to the busbar of the structure of the above (3), the adjoining two cell electrodes are electrically connected by a plurality of coupling plate portions provided therebetween so as to be arranged in parallel. Therefore, the conducting cross section of the busbar of the present structure can be increased by juxtaposing a plurality of point-contact coupling plate portions. Moreover, according to the busbar of the present structure where the two cell electrodes are electrically connected in parallel by a plurality of coupling plate portions, heat generation can be suppressed by shunting current. Further, according to the busbar of the present structure where the two cell electrodes are electrically connected in parallel by a plurality of coupling plate portions, large current can be passed by increasing the amount of heat radiation by increasing the surface area.

Moreover, with the present structure where the two cell electrodes are electrically connected in parallel by a plurality of coupling plate portions, temperature rise can be suppressed compared with one busbar having the same cross-sectional area. That is, when the same temperature rise is a design value, according to the present structure where a plurality of coupling plate portions are provided so as to be arranged in parallel, compared with the busbar where one coupling plate portion of the same cross section is provided, metal usage can be reduced, so that the material cost of the busbar can be reduced.

Moreover, according to the present structure where the two cell electrodes are electrically connected in parallel by a plurality of coupling plate portions, by changing the number of coupling plate portions according to the current flowing between the two cell electrodes, the coupling plate portions can be commonly used for various battery packs, so that the manufacturing cost of the busbar can be reduced.

(4) A busbar module provided with: the busbar according to any one of the above (1) to (3) configured to be attached to an assembled battery where the battery cells are juxtaposed; and an insulating resin casing that has a busbar accommodating chamber for accommodating the busbar.

According to the busbar module of the structure of the above (4), since the busbars having the protrusions that are in contact with the cell electrodes are accommodated in the busbar accommodating chambers, respectively, when the case and the assembled battery are assembled together, a multiplicity of busbars can be collectively brought into intimate contact excellently with the cell electrodes. With the busbar module, since the coupling plate portions of a plurality of busbars where no springback occurs can be simultaneously and surely brought into intimate contact with the cell electrodes when they are welded to the cell electrodes, the weld quality of the busbars and the cell electrodes can be improved and the manufacturing cost of the assembled battery can be reduced.

(5) A battery pack provided with: the busbar module according to the above (4); and the assembled battery.

According to the battery pack of the structure of the above (5), when the coupling plate portions of the busbars accommodated in the busbar modules are brought into intimate contact with the cell electrodes for welding to the cell electrodes, it is unnecessary to press them with a heavy load. For this reason, a welding machine provided with a welding electrode capable of pressing strongly is unnecessary, so that increase in the manufacturing cost of the battery pack can be suppressed.

Moreover, with the battery pack, since the welding load on the cell electrodes of the busbars provided in the busbar modules is reduced, the strength of the cell electrodes and the portions in the neighborhood of the cell electrodes can be reduced, so that it is unnecessary to use high-strength members that withstand a heavy welding load. As a consequence, the member cost of the assembled battery can be reduced.

According to the busbar, the busbar module and the battery pack of the present invention, it is made unnecessary to deform the busbar with a strong force when the busbar is weld-connected between the cell electrodes of the battery cells that vary in height tolerance and flatness, so that weld connection can be made inexpensively.

The present invention has been briefly described above. Further, details of the present invention will be further clarified by reading through the mode for carrying out the invention (hereinafter, referred to as "embodiment") described below with reference to the attached drawings.

DETAILED DESCRIPTION OF THE EXEMPLARY EMBODIMENTS

Hereinafter, an embodiment according to the present invention will be described with reference to the drawings.

Figure 1:
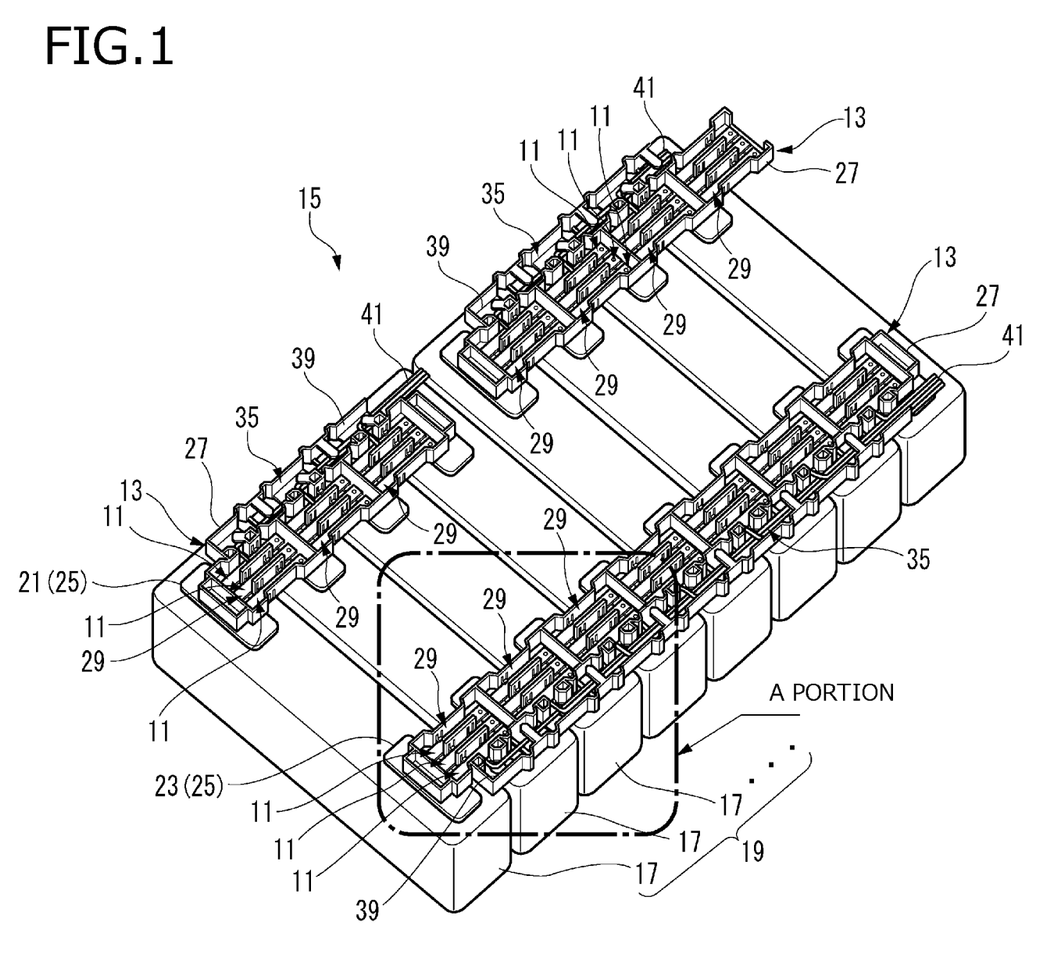
FIG. 1 is a perspective view of a battery pack where busbar modules accommodating busbars according to an embodiment of the present invention are attached.

FIG. 1 is a perspective view of a battery pack 15 where busbar modules 13 accommodating busbars 11 according to the embodiment of the present invention are attached.

The busbars 11 according to the present embodiment may be suitably used for the busbar modules 13 shown in FIG. 1. The busbar modules 13 are attached to an assembled battery 19 where a plurality of battery cells 17 are arranged in a line (juxtaposed). The busbar modules 13 and the assembled battery 19 constitute the battery pack 15.

In the present embodiment, the battery cell 17 is formed in a plate form, and a positive cell electrode 21 and a negative cell electrode 23 are provided at the ends in the direction of the length of the upper end surface which is a rectangular plane surface. Hereinafter, mere "cell electrodes 25" will be a generic name for the positive cell electrode 21 and the negative cell electrode 23. These cell electrodes 25 are formed in the form of a rectangular plate terminal. The adjoining battery cells 17 are electrically connected in series or in parallel by weld-connecting the busbars 11 provided between the cell electrodes 25. The assembled battery 19 shown in FIG. 1 is structured such that eight battery cells 17 are integrated that are juxtaposed so that four positive cell electrodes 21 and four negative cell electrodes 23 are alternately arranged with the plate surfaces thereof facing each other.

Figure 2:
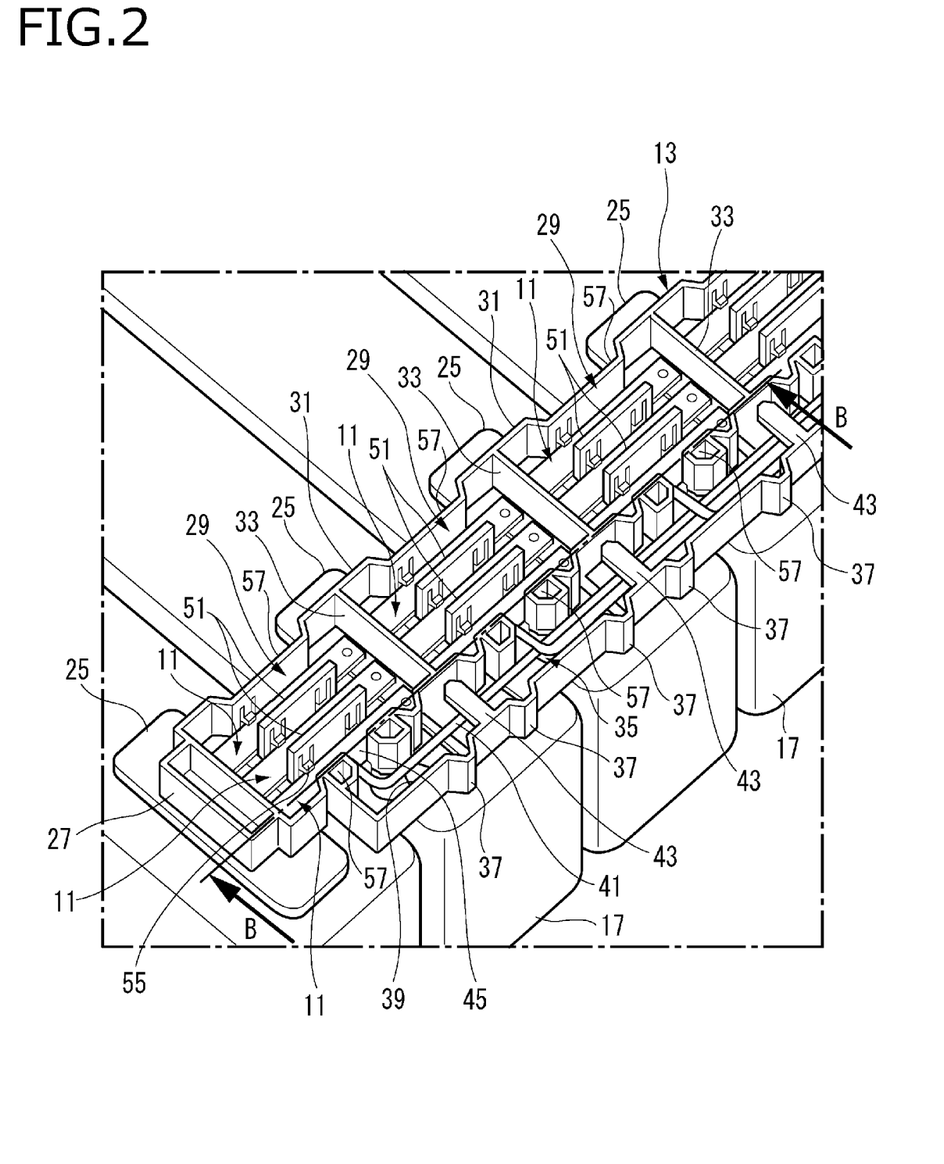
FIG. 2 is an enlarged view of an A portion of the battery pack shown in FIG. 1.

FIG. 2 is an enlarged view of an A portion of the battery pack 15 shown in FIG. 1.

In the busbar module 13, a casing 27 as the main body is integrally formed of an insulating resin material. To the casing 27, a plurality of busbar accommodating chambers 29 having a rectangular box shape are coupled through an elastically deformable tolerance absorbing portion 31 in the direction of arrangement of the battery cells 17. The adjoining busbar accommodating chambers 29 are partitioned by partition walls 33. In the busbar accommodating chambers 29, the cell electrodes 25 of the adjoining battery cells 17 are disposed. In the busbar accommodating chambers 29, the busbars 11 are accommodated that are made of a conductive metal plate for electrically connecting between these cell electrodes 25.

In the casing 27, a wire routing portion 35 is integrally formed in the direction of coupling of the busbar accommodating chambers 29. On the outer side wall of the wire routing portion 35, elastically deformable tolerance absorbing portions 37 are formed. The wire routing portion 35 has a wire routing groove 39 extending in the direction of juxtaposition of the battery cells 17. In the wire routing groove 39 of the wire routing portion 35, voltage detecting wires 41 are routed. A plurality of voltage detecting wires 41 routed in the wire routing groove 39 are restrained by wire holding pieces 43 from protruding out of the wire routing groove 39. A plurality of voltage detecting wires 41 are routed so as to correspond to the busbar accommodating chambers 29. The voltage detecting wires 41 pass through wire connection openings 45 formed in the busbar accommodating chambers 29 and are conductively connected to the busbars 11 accommodated in the busbar accommodating chambers 29.

As described above, the busbar modules 13 according to the present embodiment are structured such that the casing 27 is attached to the assembled battery 19 where a plurality of battery cells 17 are juxtaposed and that a plurality of busbars 11 provided between the cell electrodes 25 of the adjoining battery cells 17 to electrically connect them are provided.

Figure 3:
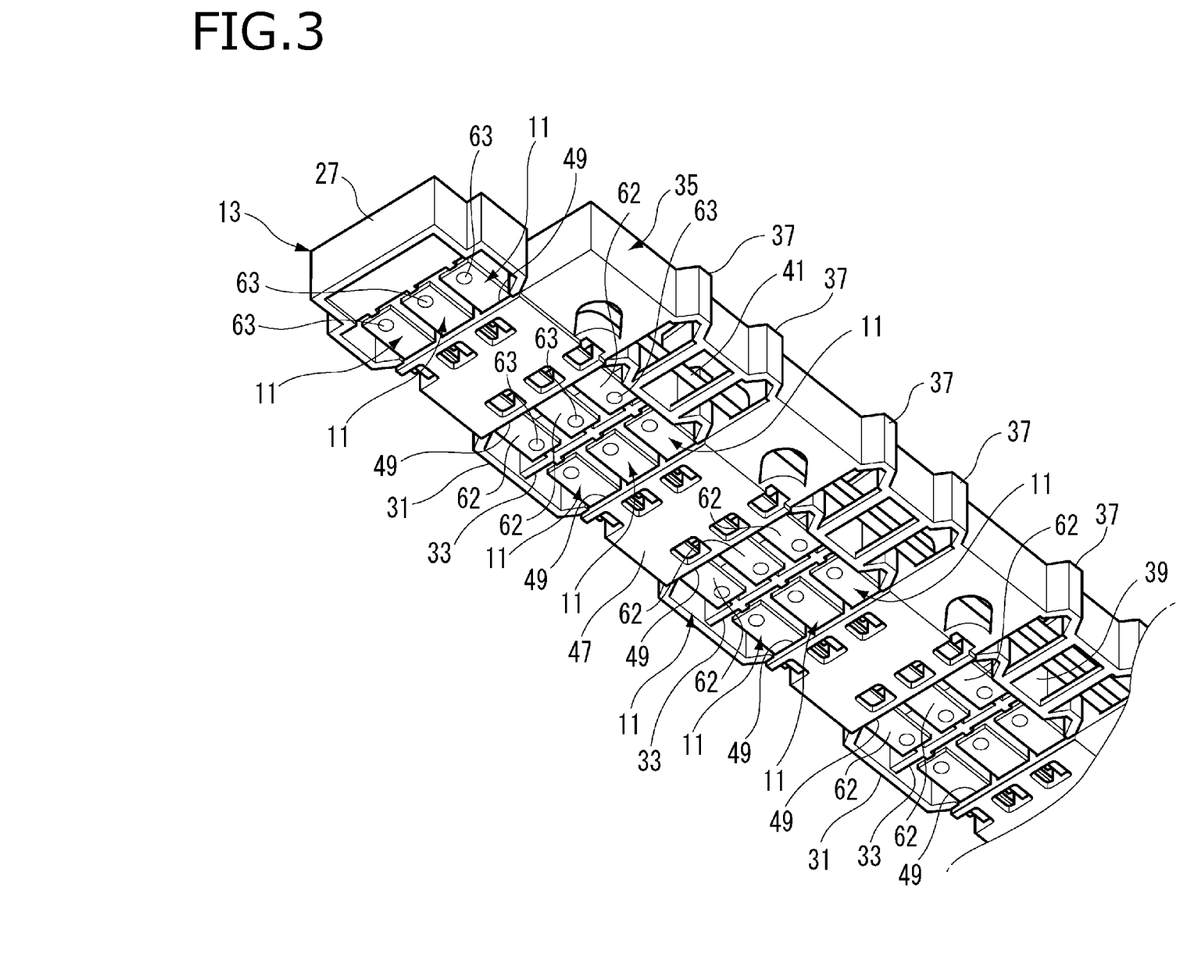
FIG. 3 is a perspective view of the busbar module shown in FIG. 2 viewed from the lower surface side.

FIG. 3 is a perspective view of the busbar module 13 shown in FIG. 2 viewed from the lower surface side.

A bottom wall 47 is formed at the bottom portion of each busbar accommodating chamber 29. On the bottom wall 47 of each busbar accommodating chamber 29, an electrode exposing opening 49 is formed that makes the two cell electrodes 25 of the adjoining battery cells 17 exposed into the busbar accommodating chamber 29. The busbars 11 accommodated in the busbar accommodating chambers 29 can be in contact with the two cell electrodes 25 of the adjoining battery cells 17 through the electrode exposing openings 49.

Figure 4:
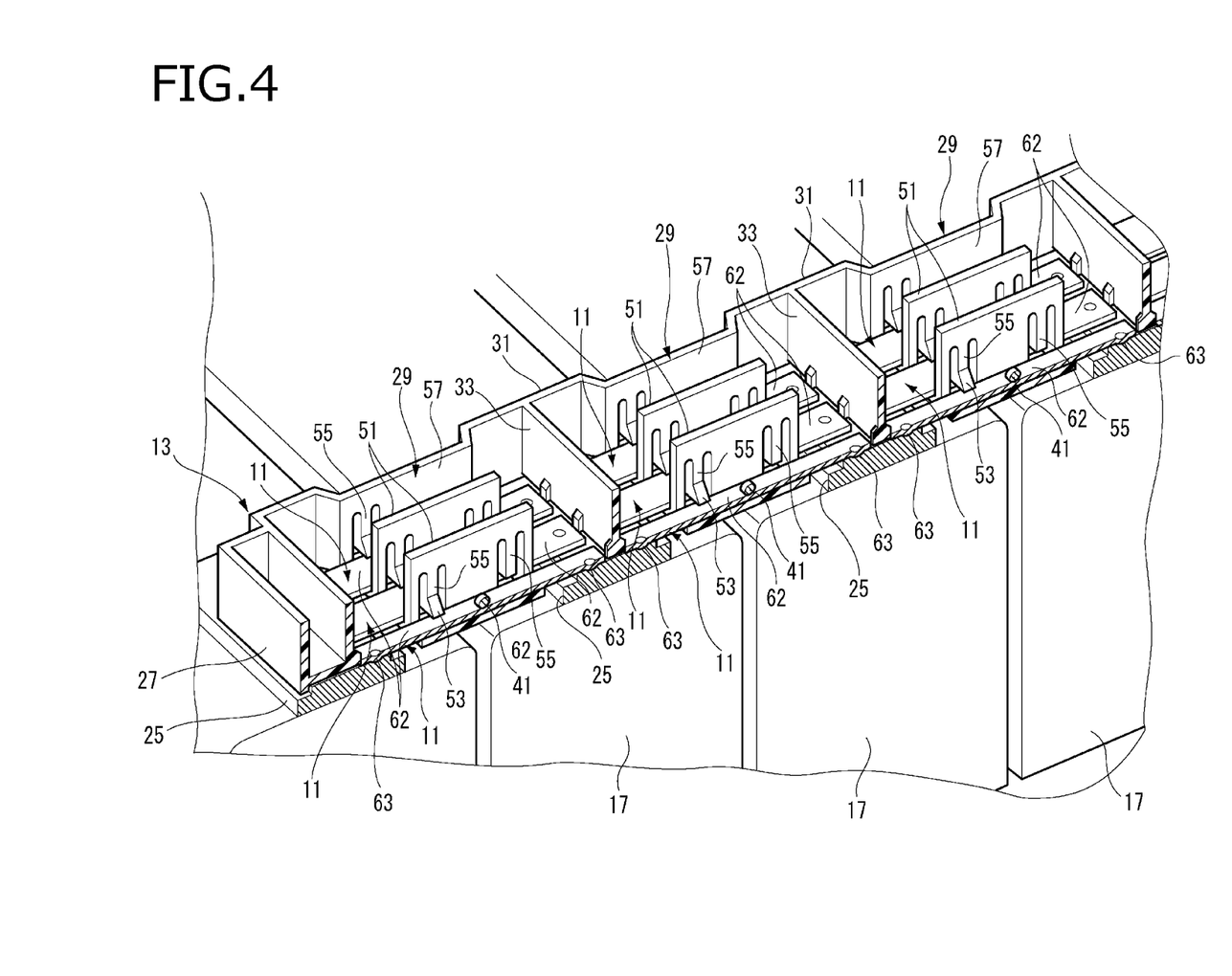
FIG. 4 is a cross-sectional view of the busbar module shown in FIG. 2 viewed along the line shown by the arrow B-B.

FIG. 4 is a cross-sectional view of the busbar module 13 shown in FIG. 2 viewed on the line shown by the arrow B-B.

In each busbar accommodating chamber 29, a plurality of parallel busbar partition walls 51 extending in the direction of juxtaposition of the battery cells 17 are provided upright. In the present embodiment, two busbar partition walls 51 are disposed in parallel. Thereby, three busbar accommodating spaces partitioned by the busbar partition walls 51 are defined in one busbar accommodating chamber 29. That is, in the present embodiment, three busbars 11 can be accommodated in one busbar accommodating chamber 29. As described above, in the present embodiment, a plurality of (three) busbars 11 arranged in parallel are provided between the two cell electrodes 25 disposed adjacent to each other and electrically connect between the two cell electrodes 25 in parallel. The numbers of busbar partition walls 51 and busbars 11 are not limited thereto.

On each busbar partition wall 51, a plurality of busbar holding pieces 55 the upper end of which is a base end and the lower end of which is a free end having an engagement claw 53 are formed. When the busbars 11 are attached, these busbar holding pieces 55 are bent to enable the attachment of the busbars 11. The busbar holding pieces 55 hold, with a predetermined clearance, the busbars 11 set in normal attachment positions. That is, the busbars 11 held in the busbar accommodating chambers 29 are held in the busbar accommodating spaces so as to be movable by the predetermined clearance. By this movably holding structure, the busbars 11 are movable in response to the displacement due to the tolerance between the cell electrodes 25.

The busbar holding pieces 55 are provided not only on the above-mentioned busbar partition walls 51 but also on accommodating chamber side walls 57 of the busbar accommodating chambers 29.

Figure 5:
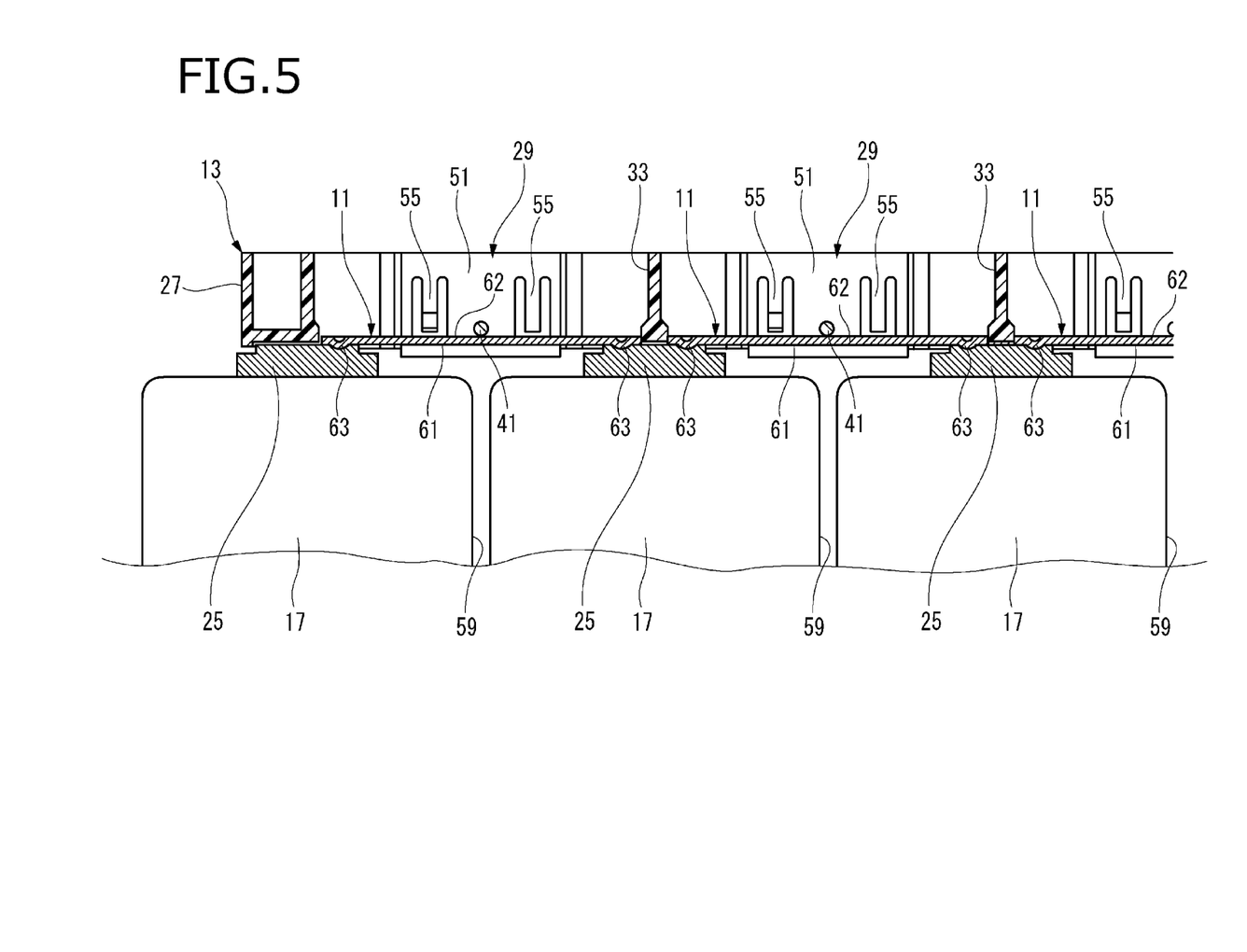
FIG. 5 is a cross-sectional front view of the busbar module shown in FIG. 4.

FIG. 5 is a cross-sectional front view of the busbar module 13 shown in FIG. 4.

In the present embodiment, on each battery cell 17, the cell electrode 25 is disposed so as to protrude from the upper surface of a body case 59. The busbar module 13 placed on the assembled battery 19 is disposed so that the electrode exposing openings 49 of the busbar accommodating chambers 29 coincide with the cell electrodes 25 of the battery cells 17 of the assembled battery 19, respectively. That is, coupling plate portions 62 of the busbars 11 are provided between the cell electrodes 25 provided on the upper surfaces of the body cases 59 of the adjoining battery cells 17. Both end portions, in the direction of juxtaposition of the battery cells 17, of the coupling plate portions 62 of the busbars 11 accommodated in the busbar accommodating chambers 29 are conductively connected to the cell electrodes 25 of the adjoining battery cells 17.

Here, the busbars 11 are each provided with: the coupling plate portion 62 of a rectangular plate form provided between the cell electrodes 25 provided on the upper surfaces of the adjoining two battery cells 17, respectively; and a total of not more than three (in the present embodiment, a total of two; one is made in contact at each end portion of the coupling plate portion 62) protrusions 63 protruded on a lower surface 61 which is a facing surface of the coupling plate portion 62 facing the cell electrodes 25 so that at least one is in contact with each of the two cell electrodes 25.

The protrusions 63 will also be referred to as indents. The indents are formed, for example, by stretch forming. In the stretch forming, the busbar 11 is placed on a die having a hole, and the coupling plate portion 62 of the busbar 11 is held between a plate presser and the die. The parts of the coupling plate portion 62 corresponding to the holes are pressed by a punch from the side opposite to the die. In the stretch forming, the part of the coupling plate portion 62 in contact with the head portion of the punch and the neighborhood thereof are stretched and formed into a shape following the hole of the die. The indents of the present embodiment are formed so that the tip of the protrusion is substantially hemispherical. The protrusion form and the forming method of the indents are not limited thereto.

Figure 6A:
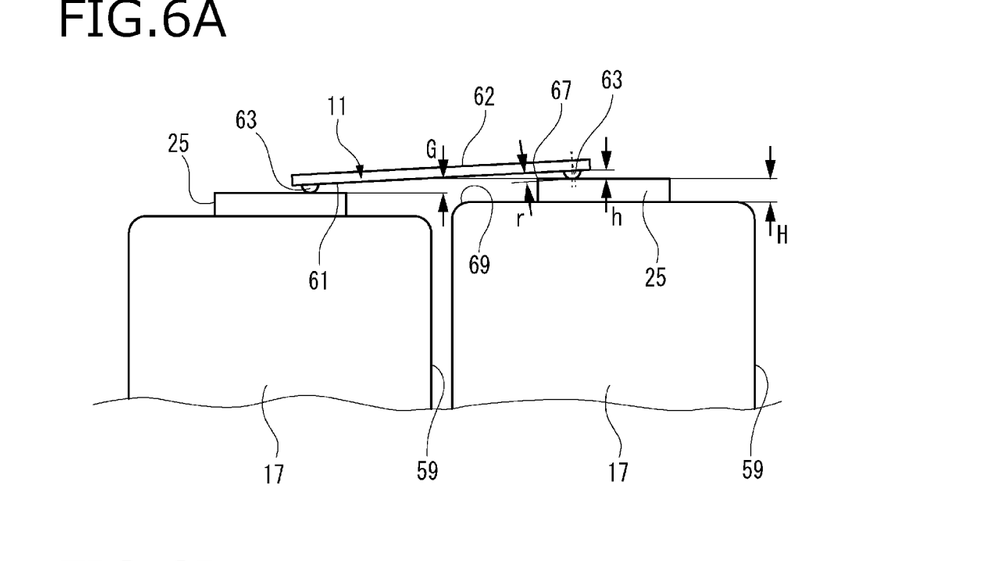
FIG. 6A is a schematic view explaining a protrusion height of the protrusions on the busbar.
Figure 6B:
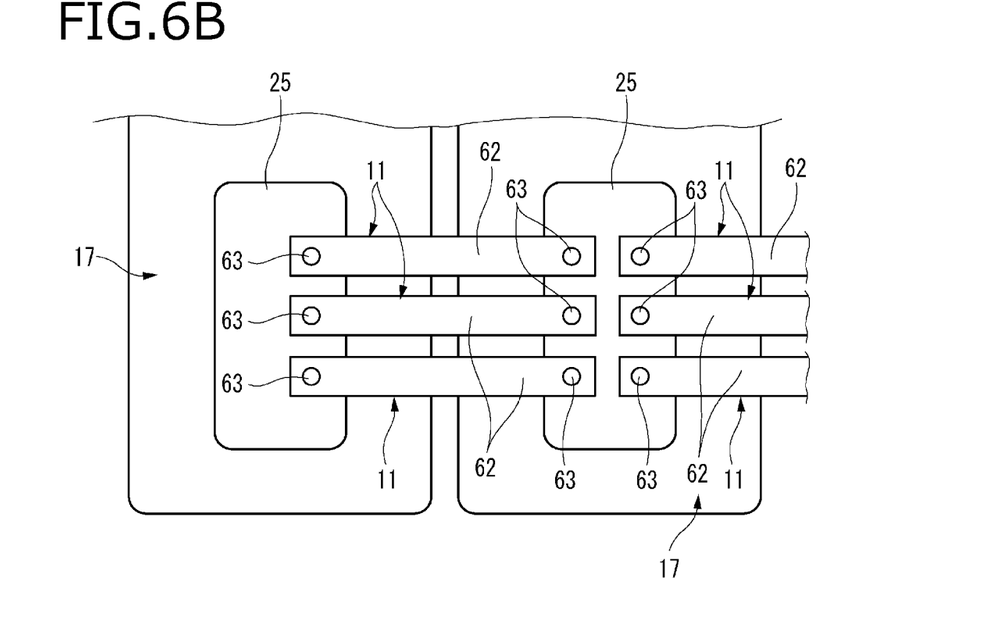
FIG. 6B is a plan view explaining the juxtaposed busbars.

FIG. 6A is a schematic view explaining a protrusion height h of the protrusions 63 on the busbar 11. FIG. 6B is a plan view explaining the juxtaposed busbars 11.

As shown in FIG. 6A, the protrusion height h from the lower surface 61 of the coupling plate portion 62 at the protrusion 63 is set to a dimension such that the lower surface 61 of the coupling plate portion 62 inclined because of a displacement G caused by the dimensional tolerance between the two battery cells 17 disposed adjacent to each other is in contact with no other members. When the protrusion 63 is formed in a hemispherical shape, the protrusion height h may be the radius r of the hemisphere.

Figures 7A, 7B:
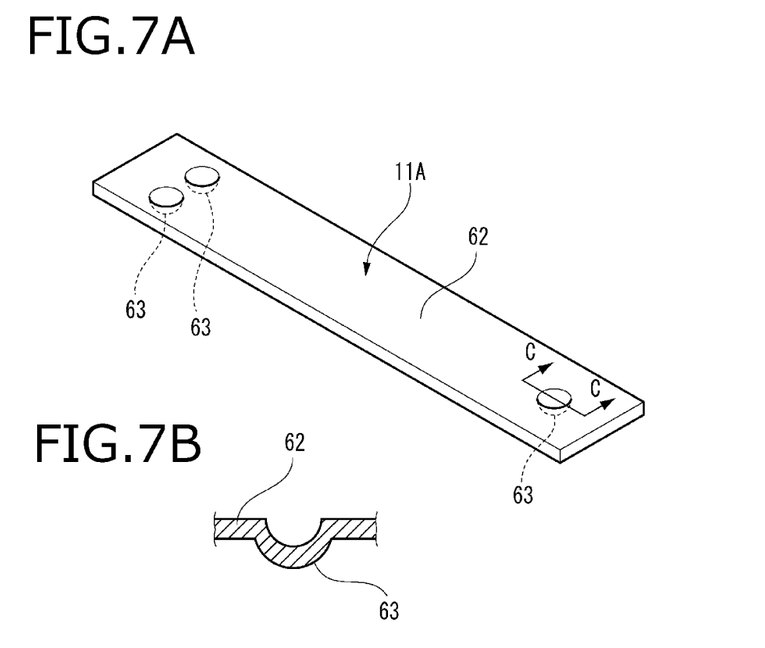
FIG. 7A is a perspective view of a busbar according to a modification where three protrusions are formed.
FIG. 7B is a cross-sectional view of the busbar shown in FIG. 7A viewed along the line shown by the arrow C-C.
Figure 7C:
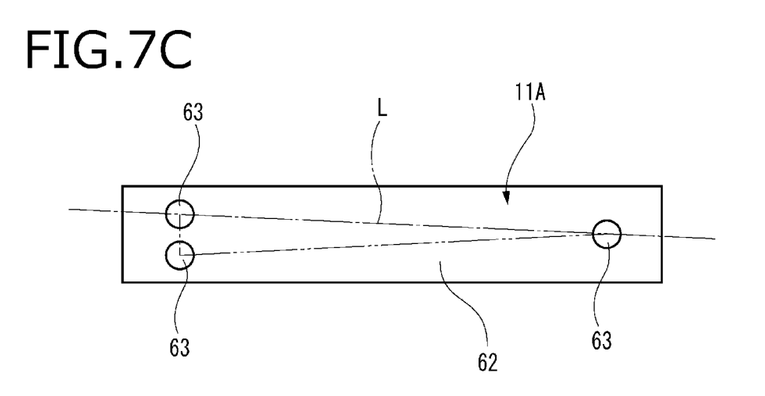
FIG. 7C is a plan view of the busbar shown in FIG. 7A.

FIG. 7A is a perspective view of a busbar 11A according to a modification where three protrusions 63 are formed on the lower surface 61 of the coupling plate portion 62. FIG. 7B is a cross-sectional view of the busbar 11A shown in FIG. 7A viewed along the line shown by the arrow C-C. FIG. 7C is a plan view of the busbar 11A shown in FIG. 7A.

As shown in FIGS. 7A to 7C, the protrusions 63 may be formed on the lower surface 61 of the coupling plate portion 62 so that a total of three are provided such that two of them are in contact with either one of the two cell electrodes 25. When the number of protrusions 63 is three in total, a structure is desirable in which on straight lines L passing the two protrusions 63 in contact with the adjoining two cell electrodes 25, respectively, another one protrusion 63 is not disposed like the busbar 11A shown in FIG. 7C. That is, the three protrusions 63 are disposed at the vertices of a triangle (shown by imaginary lines in FIG. 7C), respectively. This is because when the adjoining two cell electrodes 25 are flush with each other, all the three protrusions 63 on the same straight line can be in contact and when the two cell electrodes 25 are not flush with each other, one of the three protrusions 63 is highly likely to be out of contact.

While the two protrusions 63 formed on the left end portion on the busbar 11A shown in FIG. 7C are protruded so as to be aligned in the direction of the width of the coupling plate portion 62 and are formed at an equal distance from the protrusion 63 formed at the upper end portion on the busbar 11A, the two protrusions in contact with either one of the cell electrodes 25 according to the present invention are not necessarily at an equal distance from the protrusion in contact with the other cell electrode 25.

Next, the workings of the above-described structure will be described.

Figure 8A:
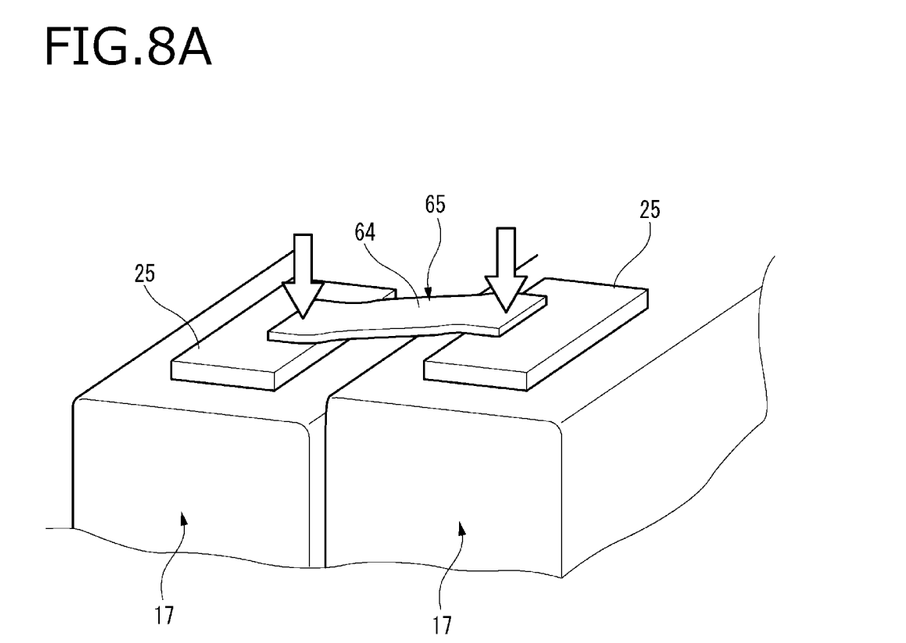
FIGS. 8A and 8B are a perspective view and a plan view of the battery cells where the cell electrodes are interconnected by conventional busbars.
Figure 8B:
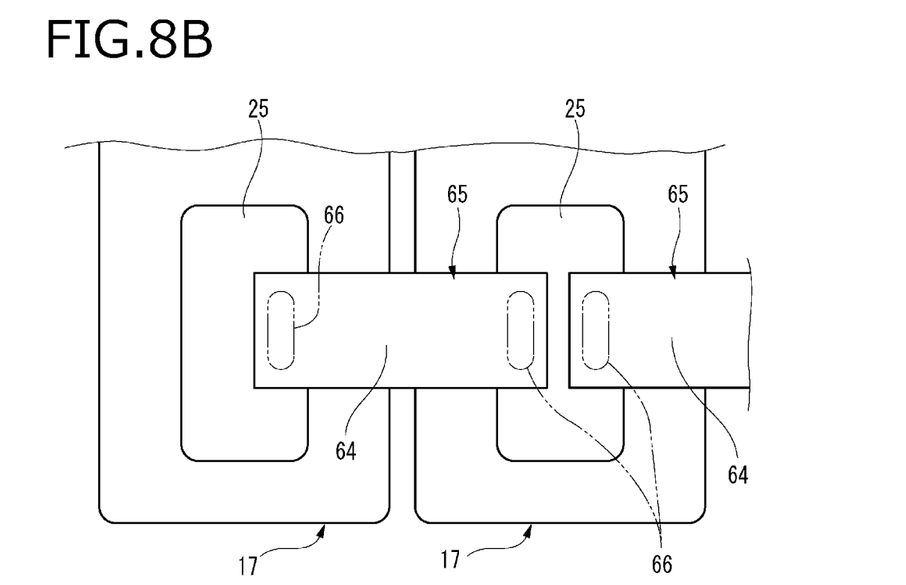

FIGS. 8A and 8B are a perspective view and a plan view of the battery cells 17 where the cell electrodes 25 are interconnected by conventional busbars 65. As shown in FIGS. 8A and 8B, when the conventional busbars 65 and the cell electrodes 25 are weld-connected in order to electrically connect the assembled battery 19, it is necessary to set the busbars 65 and the cell electrodes 25 so as to be in intimate contact (surface contact) at welded portions 66. Here, if there are position variations among the cell electrodes 25 of the battery cells 17, the welded portions 66 of coupling plate portions 64 of the busbars 65 are separated from the cell electrodes 25. In such a case, with the conventional busbars 65, an extremely heavy load is required for pressing the busbars 65 against the cell electrodes 25 when the busbars 65 and the cell electrodes 25 are weld-connected. For this reason, with the conventional busbars 65, the intimate contact area of the welded portions 66 is difficult to secure, so that it can be difficult to ensure intimate contact. Moreover, when the weld connection is performed with the busbars 65 being pressed against, there is a problem in that a spring-back load remains on the coupling plate portions 64. If the spring-back load remains as an internal stress after welding, vibration resistance of the busbars 65 is decreased.

On the contrary, on the busbars 11 according to the present embodiment, on the lower surfaces 61 of the coupling plate portions 62 provided between the cell electrodes 25 of the adjoining battery cells 17, a total of two protrusions 63 are formed so that at least one is in contact with each of the two cell electrodes 25. The above-described busbars 11 are capable of absorbing variations in the height tolerance and flatness of the cell electrodes 25 by these protrusions 63 protruding from the lower surfaces 61 of the coupling plate portions 62 facing the cell electrodes 25. Therefore, with the busbars 11 weld-connected between the cell electrodes 25 of the battery cells 17, pressing with a heavy load that deforms the coupling plate portions 62 is unnecessary in order to bring them into intimate contact with the cell electrodes 25.

Moreover, with the busbars 11 according to the present embodiment, a conventional step bending structure or the like for making the coupling plate portions 62 easy-to-deform is unnecessary. Since the step bending structure or the like of the coupling plate portions 62 is unnecessary for the busbars 11, reduction in the height of the busbars 11 and reduction in manufacturing cost can be achieved.

Moreover, with the busbars 11 according to the present embodiment, since pressing with a heavy load that deforms the coupling plate portions 62 is unnecessary, a load for the coupling plate portions 62 to return to the original shape (spring-back load) does not remain. With the busbars 11 where no springback occurs on the coupling plate portions 62, vibration resistance of the points of contact with the cell electrodes 25 can be improved and the strength design of the cell electrodes 25 is easy.

Moreover, with the busbars 11 according to the present embodiment, the protrusions 63 are formed with a protrusion height h where the lower surfaces 61 of the coupling plate portions 62 are in contact with no other members also by the inclination of the busbars 11 caused by the dimensional tolerance between the battery cells 17. The other members are members other than the busbars 11. Therefore, the lower surfaces 61 of the coupling plate portions 62 of the busbars 11 are set so as not to be in contact with the cell electrodes 25, either. That is, the coupling plate portions 62 of the busbars 11 are in contact with the cell electrodes 25 only at the protrusions 63. This is in order to avoid a situation in which the lower surfaces 61 of the coupling plate portions 62 abut on electrode angular portions 69 which are members other than the cell electrodes 25 first and the protrusions 63 become separated from the cell electrodes 25 as shown in FIG. 6A. When the cell electrodes 25 are disposed so as to be substantially flush with the upper surfaces (the body surfaces) of the body cases 59 of the battery cells 17 (when H shown in FIG. 6A is 0), the protrusion height h of the protrusions 63 is set to a dimension such that the lower surfaces 61 of the busbars 11 do not interfere with body angular portions 69. By the protrusions 63 being set with such a protrusion height h, even if the adjoining battery cells 17 are displaced within a range of the dimensional tolerance, with the busbars 11, a total of not more than three protrusions 63 such that at least one is in contact with each of the adjoining cell electrodes 25 can be surely brought into contact.

Moreover, with the busbars 11 according to the present embodiment, as shown in FIG. 6B, the adjoining two cell electrodes 25 are electrically connected by a plurality of (three) coupling plate portions 62 provided therebetween so as to be arranged in parallel. Therefore, the conducting cross sections of the busbars 11 can be increased by juxtaposing a plurality of point-contact coupling plate portions 62. Moreover, with the busbars 11 of the present embodiment where the two cell electrodes 25 are electrically connected in parallel by a plurality of coupling plate portions 62, heat generation can be effectively suppressed by shunting current. Further, with the busbars 11 of the present embodiment where the two cell electrodes 25 are electrically connected in parallel by a plurality of coupling plate portions 62, large current can be passed by increasing the amount of heat radiation by increasing the surface area.

Moreover, with the structure of the busbars 11 according to the present embodiment where a plurality of coupling plate portions 62 are electrically connected in parallel between the two cell electrodes 25 as shown in FIG. 6B, temperature rise can be suppressed compared with one busbar 65 having the same cross-sectional area (see FIG. 8B). The temperature rise can be expressed by temperature rise is equal to (heat generation amount-heat radiation amount)/heat capacity. That is, when the same temperature rise is a design value, with the busbars 11 of the present embodiment where a plurality of coupling plate portions 62 are provided so as to be arranged in parallel, compared with the busbars 65 where one coupling plate portion 64 of the same cross section is provided, metal usage can be reduced, so that the material cost of the busbars 11 can be reduced.

Moreover, with the busbars 11 of the present embodiment where the two cell electrodes 25 are electrically connected in parallel by a plurality of coupling plate portions 62, by changing the number of coupling plate portions 62 according to the current flowing between the two cell electrodes 25, the coupling plate portions 62 can be commonly used for various battery packs 15, so that the manufacturing cost of the busbars 11 can be reduced.

With the busbar modules 13 according to the present embodiment, since the busbars 11 having the protrusions 63 that are in contact with the cell electrodes 25 are accommodated in the busbar accommodating chambers 29, respectively, when the casing 27 and the assembled battery 19 are assembled together, a multiplicity of busbars 11 can be collectively brought into intimate contact excellently with the cell electrodes 25. With the busbar modules 13, since the coupling plate portions 62 of a plurality of busbars 11 where no springback occurs can be simultaneously and surely brought into intimate contact with the cell electrodes 25 when they are welded to the cell electrodes 25, the weld quality of the busbars 11 and the cell electrodes 25 can be improved and the manufacturing cost of the assembled battery 19 can be reduced.

Moreover, as shown in FIGS. 7A to 7C, the number of protrusions 63 of the busbars 11A may be a total of three. That is, the coupling plate portion 62 provided between the cell electrodes 25 are in contact with either one of the cell electrodes 25 at two protrusions 63. Increasing the number of protrusions 63 protruded on the lower surface 61 of the coupling plate portion 62 to increase the area of intimate contact with the cell electrodes 25 is advantageous particularly when high current is passed. However, the busbar 11A is such that all the contact points can be stably in contact by the three protrusions 63 being in contact with the contacted surfaces of the cell electrodes 25, and when a fourth protrusion 63 is provided, contact failure is apt to occur at any one of the contact points, which can cause heat generation at the contact point of the protrusion 63 where contact failure occurs.

And with the busbar 11A where three protrusions 63 are protruded on the coupling plate portion 62, since the posture is stable when it is placed on the cell electrodes 25, weld connection is facilitated.

With the busbars 11 and 11A according to the present embodiment, by setting the number of protrusions 63 that are in contact with the cell electrodes 25 to a total of not more than three (that is, two or three) such that at least one is in contact on the lower surface 61 facing the cell electrodes 25, the protrusion 63 where contact failure is apt to occur can be excluded while intimate contact with the cell electrode 25 is made. As described above, with the busbars 11 and 11A, by setting the number of protrusions 63 that are in contact with the cell electrodes 25 to two or three, the intimate contact of all the contact portions can be ensured without the need to deform the coupling plate portions 62 welded to the cell electrodes 25 by pressing them against the cell electrodes 25. As a consequence, management points for welding are limited and this facilitates management, so that the welding cost of the busbars 11 and 11A can be reduced.

With the battery pack 15 according to the present embodiment, when the busbars 11 (11A) accommodated in the busbar modules 13 are brought into intimate contact with the cell electrodes 25 for welding to the cell electrodes 25, it is unnecessary to press them with a heavy load. For this reason, a welding machine provided with a welding electrode capable of pressing strongly is unnecessary, so that increase in the manufacturing cost of the battery pack 15 can be suppressed.

Moreover, with the battery pack 15, since the welding load on the cell electrodes 25 of the busbars 11 (11A) provided in the busbar modules 13 is reduced, the strength of the cell electrodes 25 and the portions in the neighborhood of the cell electrodes can be reduced, so that it is unnecessary to use high-strength members that withstand a heavy welding load. As a consequence, the member cost of the assembled battery 19 can be reduced.

Therefore, according to the busbars 11 and 11A of the present embodiment, it is made unnecessary to deform the busbars 11 with a strong force when the busbars 11 and 11A are weld-connected between the cell electrodes 25 of the battery cells 17 that vary in height tolerance and flatness, so that weld connection can be made inexpensively.

According to the busbar module 13 of the present embodiment, the weld quality of the busbars 11 (11A) and the cell electrodes 25 can be improved and the manufacturing cost of the assembled battery 19 can be reduced.

According to the battery pack 15 of the present embodiment, since the strength of the cell electrodes 25 and the portions in the neighborhood of the cell electrodes of the body cases 59 can be reduced and it is unnecessary to use high-strength members that withstand a heavy welding load, the member cost of the assembled battery 19 can be reduced.

The present invention is not limited to the above-described embodiment but combining the structures of the embodiment with each other, and modifications and applications by one of ordinary skill in the art based on the description of the specification and known art are also what the present invention targets and are embraced in the scope the protection of which is claimed.

For example, while a case where the busbars are weld-connected to the cell electrodes is described as an example in the above-described embodiment, even if the busbars according to the present invention have a structure where busbars are conductively connected to the cell electrodes by a pressurization structure, a similar effect to the above-described one can be produced.

Moreover, in the above-described embodiment, the assembled battery 19 is structured such that eight battery cells 17 are integrated that are juxtaposed so that four positive cell electrodes 21 and four negative cell electrodes 23 are alternately arranged with the plate surfaces thereof facing each other. The assembled battery according to the present invention is not limited thereto; an assembled battery may be structured where a plurality of battery cells 17 are integrated that are juxtaposed so that the positive cell electrodes 21 and the negative cell electrodes 23 alternately adjoin each other with the plate surfaces thereof facing each other.

Now, features of the above-described embodiment of the busbar, the busbar module and the battery pack according to the present invention is briefly summarized and listed in the following [1] to [5]:

[1] A busbar (11, 11A) provided with:
a coupling plate portion (62) provided between two cell electrodes (25) respectively provided on adjoining two battery cells (17); and
a total of not more than three protrusions (63) protruded on a facing surface (lower surface 61) of the coupling plate portion (62) so that at least one of the protrusions is in contact with each of the two cell electrodes (25), the facing surface (lower surface 61) of the coupling plate portion (62) facing the cell electrodes (25).

[2] The busbar (11, 11A) according to the above [1], wherein a protrusion height (h) of the protrusions (63) from the facing surface (lower surface 61) is set to a dimension such that the coupling plate portion (62) inclined because of a displacement caused by a dimensional tolerance between the two battery cells (17) is in contact with no other member (electrode angular portions 67, body angular portions 69).

[3] The busbar (11, 11A) according to the above [1] or [2], further comprising:
another coupling plate portion (62) provided between the two cell electrodes (25),
wherein the coupling plate portion (62) and the another coupling plate portion (62) are arranged in parallel between the two cell electrodes (25) to electrically connect between the two cell electrodes (25) in parallel.

[4] A busbar module (13) including:
the busbar (11, 11A) according to any one of the above [1] and [3] configured to be attached to an assembled battery where the battery cells are juxtaposed; and
an insulating resin casing (27) has a busbar accommodating chamber (29) for accommodating the busbar (11, 11A).

[5] A battery pack (15) including:
the busbar module (13) according to the above [4]; and
the assembled battery (19).

What is claimed is:

1. A busbar comprising:
a coupling plate portion provided between two cell electrodes respectively provided on adjoining two battery cells; and
a total of three protrusions protruded on a facing surface of the coupling plate portion and indented on an opposite surface of the coupling plate portion so that at least one of the protrusions is in contact with each of the two cell electrodes, the facing surface of the coupling plate portion facing the cell electrodes, wherein
one of the total of three protrusions is in contact with the cell electrode of one battery cell of the two battery cells, and
other two of the total of three protrusions are in contact with the cell electrode of the other battery cell of the two battery cells.

2. The busbar according to claim 1, wherein a protrusion height of the protrusions from the facing surface is set to a dimension such that the coupling plate portion inclined because of a displacement caused by a dimensional tolerance between the two battery cells is spaced away from the two battery cells and the two cell electrodes.

3. The busbar according to claim 1, further comprising:
another coupling plate portion provided between the two cell electrodes,
wherein the coupling plate portion and the another coupling plate portion are arranged in parallel between the two cell electrodes to electrically connect between the two cell electrodes in parallel.

4. A busbar module comprising:
the busbar according to claim 1 configured to be attached to an assembled battery where the battery cells are juxtaposed; and
an insulating resin casing that has a busbar accommodating chamber for accommodating the busbar.

5. A battery pack comprising:
the busbar module according to claim 4; and
the assembled battery.

6. The busbar according to claim 1, wherein
the total of three protrusions are indented to be formed in a shape of a hole, and
a tip of the protrusions is substantially hemispherical.

* * * * *